United States Patent [19]
Sugiyama et al.

[11] 3,885,126
[45] May 20, 1975

[54] ELECTRIC HEAT ACCUMULATOR UNIT

[75] Inventors: Hiroshi Sugiyama, Hiratsuka; Kiyoshi Numagami, Yokohama, both of Japan

[73] Assignee: Nissan Motor Company Limited, Yokohama, Japan

[22] Filed: June 6, 1973

[21] Appl. No.: 367,383

[30] Foreign Application Priority Data
  July 13, 1972  Japan.............................. 47-83187
  June 7, 1972  Japan.............................. 47-67686
  Oct. 4, 1972  Japan.............................. 47-115558
  July 13, 1972  Japan.............................. 47-83188

[52] U.S. Cl. ................. 219/365; 126/400; 165/18; 165/122; 219/364; 219/368; 219/371; 219/378
[51] Int. Cl. ...................... H05b 1/02; F24h 7/04
[58] Field of Search ........... 219/202, 341, 365, 364, 219/378, 366–368, 302, 530, 540, 369–371; 165/122, 104, 18; 126/400

[56] References Cited
UNITED STATES PATENTS
2,556,498  6/1951  Jackson ............................ 219/378
3,737,620  6/1973  Harvey ............................ 219/378 X

FOREIGN PATENTS OR APPLICATIONS
914,075  6/1946  France ............................ 219/341
1,440,451  10/1969  Germany ............................ 219/378
2,005,984  8/1971  Germany ............................ 219/365

*Primary Examiner*—A. Bartis

[57] ABSTRACT

An electric heat accumulator unit for use in an electrically powered motor vehicle characterized in that the unit is powered independently of the battery used to power the vehicle. The unit makes use of an accumulator which is adapted to store therein heat generated by an electric heating means operatively associated with the accumulator and energized from an external power supply. A blower is provided to circulate air through passages in the accumulator for extraction of heat therefrom. A blower is provided to circulate air through passages in the accumulator for extraction of heat therefrom. The blower may be powered by means of a thermoelectric power source in heat exchange relationship with the accumulator. A voltage regulator is provided to maintain a constant voltage from the thermoelectric power source. A temperature responsive circuit varies the blower speed as the temperature of the accumulator changes in order to maintain a substantially constant thermal output from the accumulator.

2 Claims, 8 Drawing Figures

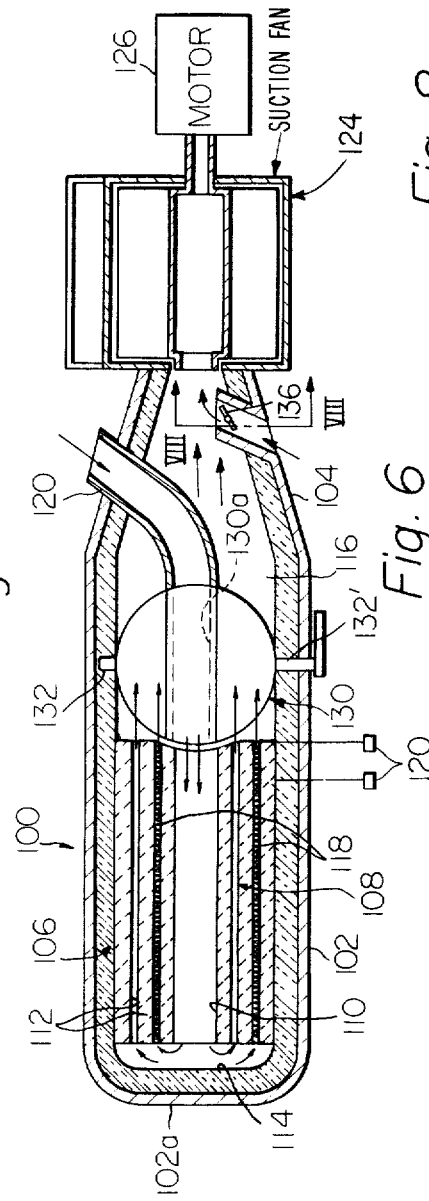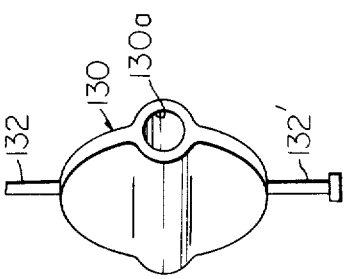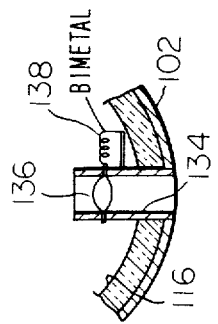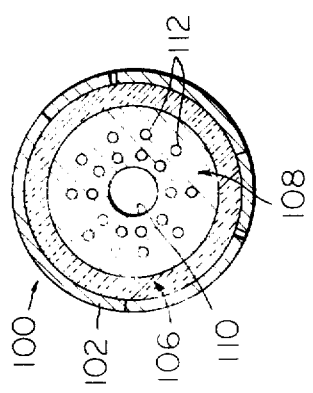

ELECTRIC HEAT ACCUMULATOR UNIT

The present invention relates to heating equipment and, more particularly, to heaters for use in moter vehicles. The heaters herein disclosed may find various applications in motor vehicles of any types but will prove particularly advantageous where incorporated into electrically powered motor vehicles.

In the heating equipment of a motor vehicle which is powered by an internal combustion engine, the engine cooling medium cooled by the operating engine is circulated to a heat-exchanger so as to heat air passed to the heat exchanger from the outside or inside of the motor vehicle and the hot air thus produced is blown off into the vehicle cabin from the heat exchanger. The heating arrangement of this nature is not applicable to the motor vehicles driven by electric motors and it has been a usual practice in the art of such motor vehicles to use electric heaters which are powered from batteries for powering the vehicle driving motors. Since, however, many hours are required for the charging of the batteries and due to the limited capacities of the batteries to be mounted on the electrically powered motor vehicles, serious design requirements are generally imposed for enabling the motor vehicles to run as long distances as possible after the charging of the batteries. It is therefore objectionable to use the vehicle powering batteries for the purpose of powering the heaters.

As an alternative to the heaters powered from the vehicle powering batteries, a heating equipment may be placed on use which is powered by the combustion of a fuel. Drawbacks are, however, still encountered in the heating equipment of this character in that it should consist of a fuel tank and a burner which are responsible for an enlarged overall configuration of the equipment and in that the equipment is in danger of fire during operation.

It is, accordingly, an important object of the present invention to provide an improved heating equipment which is well compatible with an electrically powered engine of a motor vehicle.

It is another important object of the invention to provide an improved heating equipment for use with an electrically powered automotive engine and adapted to operate entirely independently of the power source for the engine.

It is still another important object of the invention to provide an improved heating equipment for an electrically powered automotive engine and adapted to operate without resort to the combustion of a fuel.

Yet, it is another important object of the present invention to provide an improved automotive heating equipment which is so arranged as to accumulate therein a sufficient amount of heat from an external power source and to discharge the heat into the vehicle cabin at a controlled rate.

In accordance with the present invention, these objects will be accomplished basically in an heating equipment which comprises in combination air inlet means, air outlet means, a heat accumulator having passage means providing communication between the air inlet and outlet means, and valve means located between the air inlet means and the passage means in the heat accumulator and between the air outlet means and the passage means in the accumulator. The heat accumulator is operative to accumulate therein heat through energization of the accumulator from a power source which is releasably connected to the accumulator. When the valve means are closed, the air inlet and outlet means are isolated from each other by the valve means so that no airflow is developed in the heat accumulator and accordingly no hot air is delivered from the heating equipment. When, however, the valve means are open, unrestricted communication is established between the air inlet and outlet means so that a flow of air is developed through the passage means in the accumulator. The air thus passed through the passage means in the accumulator received heat from the accumulator and the resultant hot air is discharged into the vehicle cabin through the air outlet means. In one preferred embodiment of the present invention, the passage means in the heat accumulator include a plurality of passageways providing communication between the ends of the accumulator so that airflows are established between the ends of the accumulator when the valve means are open. In this instance, the valve means may include a first valve located between the air inlet means and the inlet ends of the passageways in the heat accumulator and a second valve located between the outlet ends of the passageways in the accumulator and the air outlet means. In another preferred embodiment of the present invention, the passage means in the heat accumulator includes an incoming-air passageway formed substantially centrally of the accumulator and extending from one end of the accumulator to the other and a plurality of outgoing-air passageways formed around the incoming-air passageway and extending between the ends of the accumulator. In this instance, the air inlet and outlet menas have their outlet and inlet ends opened in alignment with the inlet and outlet ends of the incoming- and outgoing-air passageways, respectively, and the valve means includes a single valve which is located between the outlet and inlet ends of the air inlet and outlet means and the inlet and outlet ends of the incoming- and outgoing-air passageways in the accumulator. The valve of this nature is adapted to simultaneously interrupt or establish the communication between the inlet and outlet means and the passageways in the heat accumulator.

Where desired, the heating equipment having the general construction above described may further comprise forcible air circulating means for establishing a forced airflow between the air inlet and outlet means when the valve means are open.

More detailed construction and operation of the heating equipment according to the present invention will become apparent from the following description taken in conjunction with the accompanying drawings in which like reference numerals and characters designate corresponding parts throughout the figures and in which:

FIG. 5 is a section on line V—V of FIG. 4;

FIG. 6 is a perspective view showing the configuration of a valve forming part of the heating equipment shown in FIGS. 4 and 5;

FIG. 7 is a longitudinal sectional view showing a third preferred embodiment of the heating equipment according to the present invention; and FIG. 8 is a section on line VIII—VIII of FIG. 7.

Figure 1:
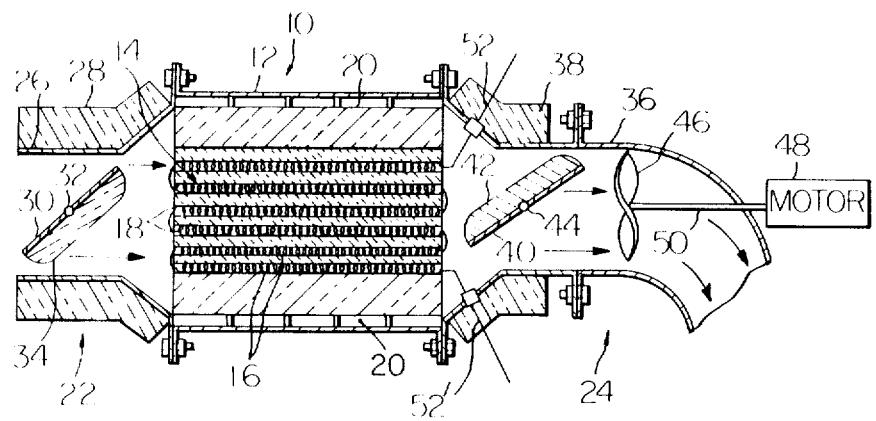
FIG. 1 is a longitudinal sectional view showing a first preferred embodiment of the heating equipment according to the present invention.

Reference will now be made to the drawings, first to FIG. 1 illustrating the first preferred embodiment of the heating equipment according to the present invention.

As seen in FIG. 1, the heating equipment embodying the present invention includes a heat accumulator 10 of a generally cylindrical configuration. The heat accumulator 10 includes a cylindrical casing 12 having open ends and enclosing therein a block 14 of heat-accumulative material such as for example porous ceramics, alumina or magnesia. The block 14 of the heat-accumulative material is formed with a pluralities of passageways 16 extending form one end of the block 14 to the other. An electric heating-resistor element or wire 18 is passed through all or some of these passageways 16. Between the outer peripheral wall of the block 14 of the heat-accumulative material and the inner surface of the casing 12 is interposed a heat insulating material 20.

The heating equipment further comprises air inlet and outlet means which are generally designated by reference numerals 22 and 24, respectively. The air inlet means 22 includes an air inlet duct 26 having an inlet end (not shown) vented from the open air and an outlet end connected to one lengthwise end of the cylindrical casing 12. The outer peripheral surface of the air inlet duct 26 adjacent to the heat accumulator 10 is lined with a heat insulating material 28. The air inlet means 22 further includes a flap valve 30 which is located within the air inlet duct 26 and immediately anterior to the inlet ends of the passageways 16 in the block 14 of the heat-accumulative material. The flap valve 30 is rotatable about a shaft 32 which is supported on the duct 26 and which is adapted to be driven to rotate by suitable control means (not shown) in a manual or automatized fashion during operation of the heating equipment. The valve 30 is lined with a heat insulating material 34.

The air outlet means 24 includes an air outlet duct 36 having an inlet end connected to the end of the cylindrical casing 12 opposite to the air inlet duct 26 and an outlet end (not shown) located in or communicating with a space to be warmed up such as for example the interior of the passenger compartment (not shown) of a motor vehicle. Similarly to the air inlet duct 26, the air oulet duct 36 is lined with a heat insulating material 38 on its outer surface adjacent to the heat accumulator 10 and supports therein a flap valve 40 through a shaft 44. The flap valve 40 is located immediately downstream of the passageways 16 in the block 14 of the heat-accumulative material and is rotatable about the shaft 44. The valve 40 is lined with heat insulating material 42. The shafts 32 and 42 supporting the flap valves 30 and 40 of the air inlet and outlet means 22 and 24 are driven to rotate in synchronism with each other from suitable control means (not shown) common to the valves 30 and 40 so that the heated air is discharged from the air outlet duct 36 at the same rate as the rate of flow of air through the air inlet duct 26. Posterior to the flap valve 40 is positioned a blow-off fan 46 which is driven from a suitable driving means 48 such as an electric motor through a shaft 50 for positively developing air streams from the air inlet duct 26 to the air outlet duct 36 through passageways 16 in the block 14 of the heat-accumulative material.

The heating wire 18 is connected to leads 52 and 52' for temporary connection to an electric power source (not shown) which is separate from the motor vehicle.

When, thus, the heating wire 18 is connected to and energized from the external power source with the flap valves 30 and 40 fully closed, the wire 18 heats the heat-accumulative material of the block 14 up to the thermal capacity of the block. Since this operation is usually carried out when the motor vehicle remains inoperative and from the power source which is independent of the battery of the motor vehicle, no extra requirements are imposed on the power source arrangement for powering the vehicle. The heat stored in the block 14 of the heat-accumulative material can be maintained unconsumed with the flap valves 30 and 40 kept closed. When the valves 30 and 40 are opened at degrees which are controlled either manually or automatically and the blow-off fan 46 driven from the motor 48 during cruising of the motor vehicle, the ambient air is sucked into the air inlet duct 26 and passed through the passageways 16 in the block 14 of the heat-accumulative material and the resultant hot air is directed to the vehicle cabin through the air outlet duct 36. The temperature of the hot air thus supplied will be controlled through proper selection of the angular positions of the flap valves 30 and 40 and the revolution speed of the blow-off fan 46.

Figure 2:
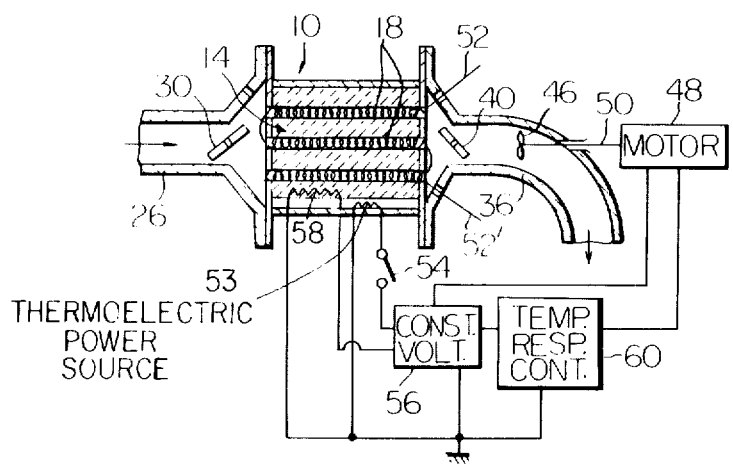
FIG. 2 is a longitudinal sectional view similar to FIG. 1 but now shows, in the form of a block diagram, an electric control arrangement to be incorporated in the heating equipment shown in FIG. 1.

The driving means 48 which has been assumed to be the electric motor may be powered from the battery of the motor vehicle or driven from any rotary member of the power train of the vehicle through, for example, a clutch because of the limited power requirement of the same. Where, however, it is desired to have the driving means 46 powered without aid of the battery mounted on the vehicle or the rotary member of the power train, arrangements may be made so that the driving means is powered by the heat of the heat accumulator 10 with use of a thermoelectric device. Since, in this instance, the heat to be dissipated from the heat accumulator 10 gradually decreases while the heating equipment is in operation, it is necessary to have the driving means 48 controlled in a manner to provide a substantially constant amount of thermal energy output irrespective of the variation in the amount of heat stored in the block 14. FIG. 2 illustrates in a block form a preferred example of an electric arrangement to acheive these ends.

Referring to FIG. 2, a thermoelectric device 53 is positioned in contact with the block 14 of the heat-accumulative material. The thermoelectric device 53 per se is well known in the art and produces an electric current from the heat transferred thereto from the block 14. The thermoelectric device 53 has an output terminal connected over a switch 54 to a constant-voltage circuit 56 which produces an output with a constant voltage from an input current produced from the thermoelectric device when the switch 54 is closed. The constant voltage output from the constant-voltage circuit 56 is fed to the motor 48 so as to drive the blow-off fan 46. In order that the current applied to the motor 48 be controlled in accordance with the temperature of the heat dissipated from the heat accumulator 10 throughout the operation of the heating equipment, a heatsensitive resistor 58 such as a thermistor is embedded in or positioned in contact with the block 14 of the heat-accumulative material. The heat-sensitive resistor 58 is connected to a temperature-responsive control circuit 60 which is connected between the constant-voltage circuit 56 and the motor 48 so as to control the revolution speed of the motor 48 in relation to the temperature of the heat transferred from the block 14 to the heat-sensitive resistor 58 whereby a substantially constant amount of thermal energy is delivered from the heating equipment.

Figure 3:
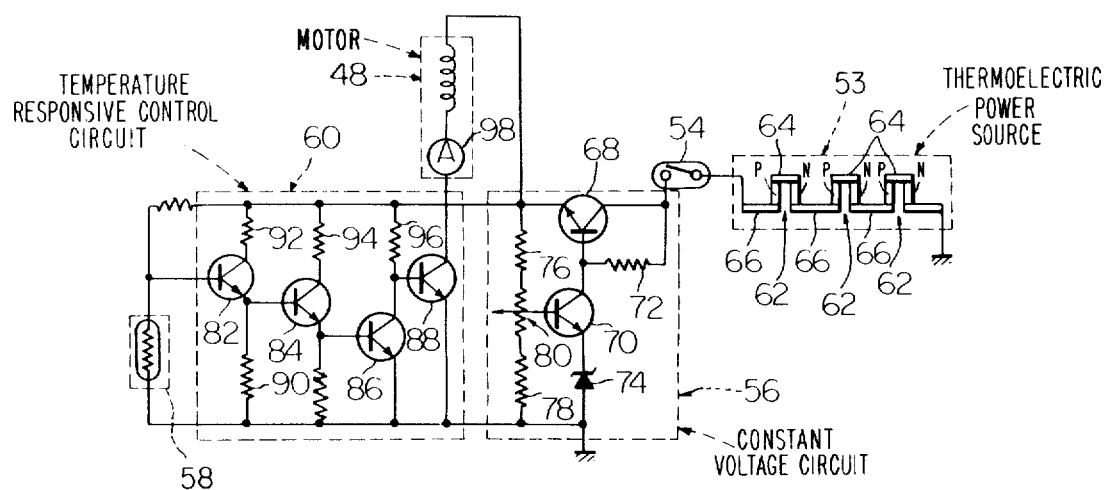
FIG. 3 is a diagram showing a preferred example of the circuit to constitute the electric control arrangement illustrated in FIG. 2.

FIG. 3 illustrates a preferred example of the electric arrangement of the nature above described. Referring to FIG. 3, the thermoelectric device 53 is shown to be constructed as a usual single-stage thermoelectric device having a plurality of semiconductor thermocouples 62 which are thermally in parallel and electrically in series. The thermocouples 62 act as thermoelectric generators and have hot junctions 64 in contact with the block 14 of the heat-accumulative material and cold junctions 66 in contact with a suitable member of a normal temperature (not shown) for producing an electric current dictated by the differential temperature between the hot and cold junctions 64 and 66, respectively. The constant-voltage circuit 56 is connected across the switch 54 to an output terminal of this thermoelectric device 53 and includes n-p-n transistors 68 and 70. The transistor 68 has its collector electrode connected across the switch 54 to the thermoelectric device 52 and its base electrode connected to the thermoelectric device through a resistor 72 and to the collector electrode of the other transistor 70. The emitter electrode of the first transistor 68 is connected to one terminal of the coil of the motor 48 while the emitter electrode of the second transistor 70 is connected to ground through a constant-voltage diode 74 such as a Zener diode. The constan74 has its cathode terminal connected to the constant-voltage diode 74 electrode of the transistor 70 and its anode terminal grounded as shown. The emitter electrode of the first transistor 68 and the anode terminal of the constant-voltage diode 74 is connected together through resistors 76 and 78 and a variable resistor 80 serially connected between the resistors 76 and 78 and having a sliding contact connected to the base electrode of the second transistor 70.

The temperature-responsive control circuit 60 has n-p-n transistors 82 to 88. The transistor 82 has its base electrode connected to the output terminal of the heat-sensitive resistor 58 and its emitter electrode connected to ground through a resistor 90. The collectors of the transistors 82, 84 and 86 are connected through resistors 92, 94 and 96, respectively, to a node between the emitter electrode of the transistor 68 and the resistor 76 of the constant-voltage circuit 56. The collector electrode of the transistor 88 is connected to the other terminal of the coil of the motor 48 through an ampere meter 98. The emitter electrodes of the transistors 84, 86 and 88 are all grounded.

During operation, the resistance value of the heat-sensitive resistor 58 gradually lowers as the amount of heat accumulated in the block 14 of the heat-accumulative material decreases. The variation in the resistance value of the resistor 58 is responded to by the control circuit 60 and thus a higher current is supplied from the constant-voltage circuit 56 in response to a lower resistance value of the heat-sensitive resistor 58, viz., to a lower temperature of the block 14. The blow-off fan 46 is consequently driven by the motor 48 at an increasing revolution speed and accordingly the hot air is delivered from the heat accumulator 10 as the amount of heat stored on the block 14 of the heat-accumulative material decreases with the result that the amount of thermal energy produced from the heat accumulator is maintained substantially at a constant level throughout the operation of the heating equipment.

Figure 4:
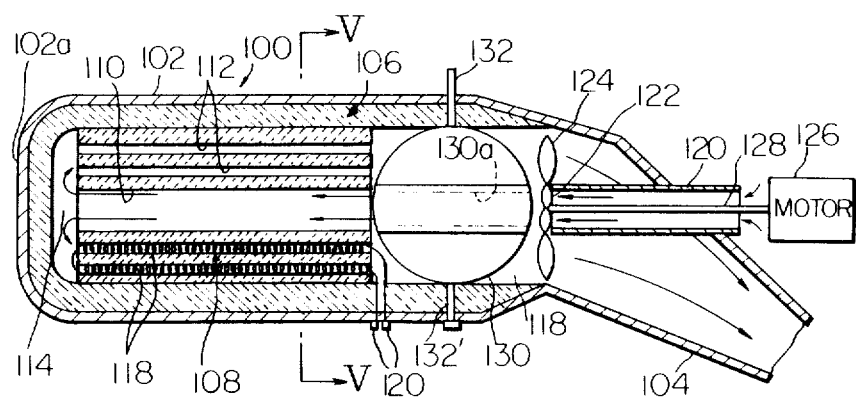
FIG. 4 is a longitudinal sectional view showing a second preferred embodiment of the heating equipment according to the present invention.

FIG. 4 illustrates a second preferred embodiment of the heating equipment according to the present invention. The heating equipment comprises a heat accumulator 100 including a generally cylindrical casing 102. The casing 102 has one end closed as at 102a and is connected at the other end to an air outlet duct 104. The casing 102 is internally lined with a heat insulating material 106 and supports therein a block 108 of a heat-accumulative material such as for example ceramics. The block 108 of the heat-accumulative material is formed with a central bore or incoming-air passageway 110 extending substantially centrally and throughout the length of the block and a number of outgoing-air passageways 112 extending around the incoming-air passageway 110, as better seen in FIG. 5. The block 108 is so located within the casing 102 as to provide a space 114 between one end of the block 108 and the end wall 102a of the casing 102 and a space 116 between the other end of the block 108 and the air outlet duct 104. The incoming-air passageway 110 is thus in contant communication with the outgoing-air passageways 112 through the space 114 between the forward end of the block 108 and the end wall 102a of the casing 102. A heating wire 118 is passed through some or all of the outgoing-air passageways 112 and connected to a source (not shown) of electric power through leads 120.

An air inlet duct 120 projects into the space 116 between the block 108 and the air outlet duct 104, having its leading end located substantially concentrically of an end portion of the casing 102 merging into the air outlet duct 104. A combination of a blow-off fan 122 and a suction fan 124 is located at the end of the space 116. More specifically, the blow-off fan 122 is located in proximity to the leading end of the air inlet duct 120 and the suction fan 124 is located in concentric relation to the former. The fans 122 and 124 are connected to and driven from a common driving means such as an electric motor 126 through a shaft 128 extending through the air inlet duct 120 as shown. Between these fans 122 and 124 and the block 108 of the heat-accumulative material is located a flap valve 130 which is rotatably supported on the casing 108 through shafts 132 and 132' oriented transversely to the longitudinal direction of the casing 102. As more clearly seen in FIG. 6, the flap valve 130 is configured generally in a disc form and has a bore 130a which extends substantially diametrically of the valve. The valve 130 is positioned relative to the block 108 and blow-off fan 122 in a manner that the bore 130a is in alignment with the leading end of the air inlet duct 120 and the incoming-air passageway 110 in the block 108 for providing substantially unrestricted communication between the air inlet duct 120 and the incoming-air passageway 110 when the valve is turned to an angular position parallel to the lengthwise direction of the casing 102, as seen in FIG. 4. Under this condition, communication is established not only between the air inlet duct 120 and the incoming-air passageway 110 but between the air outlet duct 104 and the outgoing-air passageways 112 through the space 130 on both sides of the valve 130. When, on the other hand, the valve 130 is rotated to an angular position which is transverse to the lenghtwise direction of the casing 102, then the communication between the air inlet duct 120 and the incoming-air passageway 110 and the communication between the outgoing-air passageways 112 and the air outlet duct 104 are blocked by the valve 130. The flow rates of air through the heat accumulator 100 are thus controlled from zero to maximum by changing the angular position of the valve 130 about the shafts 132 and 132'. The valve 130 is formed of or lined with a heat insulating material so as to thermally isolate the heat accumulator 100 from the ambient air when the valve 130 is fully closed.

Heat is stored on the block 108 of the heat-accumulative material by energizing the heating wire 118 from the external source (not shown) of electric power with the valve 130 fully closed. The heat thus stored in the block 108 is maintained within the heat accumulator 100 when the heating equipment is held inoperative with the valve 130 fully closed. When, then, the valve 130 is opened and the fans 122 and 124 driven from the motor 126, air is forced into the incoming-air passageway 110 through the bore 130a in the valve 130 and passed to the outgoing-air passageways 112 through the space 114 between the block 108 of the heat-accumulative material and the closed end wall 102a of the casing 102 as indicated by arrowheads in FIG. 4. Air thus passed through the outgoing-air passageways 112 is warmed up by heat stored on the block 108 of the heat-accumulative material and the resultant hot air is directed into the air outlet duct 104 through the space 116 on both sides of the valve 130. The hot air is forced out of the air outlet duct 104 by the suction fan 124 and passed over to, for example, a passenger compartment of a motor vehicle.

The degrees of communication between the incoming-air passageway 110 and the air inlet duct 120 and between the outgoing-air passageways 112 and the air outlet duct 104 can be varied and accordingly the rate of supply of hot air can be regulated by manually or automatically controlling the angular position of the valve 130. When the valve 130 is in a partly open position providing limited communications between the air inlet duct 120 and the incoming-air passageway 110 and between the outgoing-air passageways 112 and the air outlet duct 104, air sucked in through the air inlet duct 120 is partly circulated to the air outlet duct 104 through the space 116 so that air is passed to the passageways 110 and 112 at a limited rate. Since, in this condition, air is sucked in and discharged from a space 116 at rates which are proportioned to a fixed rate by reason of the fans 122 and 124 driven concurrently, air can be heated at an increased rate when desired. The thermal output of the heating equipment can thus be regulated by varying the power output of the motor 126 during operation.

FIGS. 7 and 8 illustrate a modification of the embodiment above described. As seen in FIG. 7, the heating equipment is constructed essentially similarly to the equipment shown in FIG. 4 and, thus, corresponding parts in both embodiments are designated by like reference numerals. Different from the embodiment shown in FIG. 4, the heating equipment herein illustrates has an air vent 134 through which the space 116 between the block 108 of the heat-accumulative material and the air outlet duct 104 is vented from the open air. A valve 136 is positioned in this vent 134 for opening or closing the vent or regulating the flow rate of air through the vent during operation, as will be seen more clearly in FIG. 8. The valve 136 is controlled in accordance with the temperature of the hot air in the space 116 by means of, for example, a bimetal arrangement 138 so that atmospheric air is admitted to the space 116 when the bimetal arrangement 138 responds to heat of a temperature higher than a predetermined level. The valve 134 is thus adapted to automatically regulate the temperature of the hot air to be discharged from the heat accumulator 100. In FIG. 7, the arrangement for forcibly circulating air through the block 108 of the heat-accumulative material is shown as comprising merely a suction fan 124 which may be a sirocco fan which is positioned posterior to the space 116.

What is claimed is:

1. Heating equipment of the accumulator type installed in a motor vehicle which includes air inlet means, air outlet means, a heat accumulator having passage means for providing communication between said air inlet and outlet means, an electric heating means in heat exchange relation with said accumulator, said heat accumulator being operative to store therein heat from said heating means, valve means for regulating the area of air passage of said inlet and outlet means, and an electric blower for forcibly passing air from said air inlet means through said passage means to said air outlet means, which is characterized by:

a thermoelectric device in heat exchange with said heat accumulator for converting thermal energy in said heat accumulator into a d-c power;

a constant voltage regulator connected to said thermoelectric device and supplying said d-c power to said blower, while maintaining the voltage of said power constant; and temperature-responsive current control means responsive to the temperature of said heat accumulator, said control means being connected in the circuit between said voltage regulator and said blower for regulating the magnitude of current flowing through said blower and thereby the blower speed in inversely proportionate relation to the temperature of said heat accumulator whereby a substantially constant thermal output is maintained from the accumulator.

2. Heating equipment according to claim 1, in which said temperature responsive current control means includes a heat sensitive resistor embedded in said heat accumulator and energized at a constant voltage from said voltage regulator and an electric circuit for controlling the magnitude of the current through said blower in accordance with the resistance of said heat sensitive resistor.

* * * * *